US006962178B2

(12) United States Patent
Duval

(10) Patent No.: US 6,962,178 B2
(45) Date of Patent: Nov. 8, 2005

(54) TREE PROCESSOR

(76) Inventor: Alain Duval, 4215E., 11th Street North East, Calgary, Alberta (CA), T2E 6K4

( * ) Notice: Subject to any disclaimer, the term of this patent is extended or adjusted under 35 U.S.C. 154(b) by 71 days.

(21) Appl. No.: 10/446,830

(22) Filed: May 29, 2003

(65) Prior Publication Data

US 2004/0238068 A1 Dec. 2, 2004

(51) Int. Cl.⁷ ..................... A01G 23/083; A01G 23/098
(52) U.S. Cl. ......................... 144/3.1; 144/4.1; 144/34.1; 144/24.13; 144/208.1
(58) Field of Search ............................... 144/336, 338, 144/343, 3.1, 2.1, 4.1, 34.1, 24.12; 37/302

(56) References Cited

U.S. PATENT DOCUMENTS

| | | |
|---|---|---|
| 2,477,922 A | 8/1949 | Emery et al. |
| 3,308,861 A | 3/1967 | Hamilton |
| 3,938,566 A | 2/1976 | Penfold et al. |
| 3,981,336 A | 9/1976 | Levesque |
| 3,994,327 A | 11/1976 | Bergholm et al. |
| 4,098,311 A | 7/1978 | Larsson |
| 4,194,542 A | 3/1980 | Eriksson |
| 4,222,420 A | 9/1980 | Karlsson |
| 4,239,067 A | 12/1980 | Mononen |
| 4,382,457 A | 5/1983 | Hahn |
| 4,515,192 A | 5/1985 | Eriksson |
| 4,606,385 A | 8/1986 | Williamson |
| 4,766,939 A * | 8/1988 | Forslund ................. 144/24.13 |
| 4,922,976 A | 5/1990 | Hacker |
| 5,082,036 A * | 1/1992 | Vierikko ................. 144/4.1 |
| 5,148,843 A | 9/1992 | Cote |
| 5,201,350 A * | 4/1993 | Milbourn ................. 144/24.13 |
| 5,628,354 A | 5/1997 | Kingston |
| 5,709,254 A * | 1/1998 | Argue ...................... 144/34.1 |
| 5,727,610 A | 3/1998 | Isley |
| 5,732,754 A | 3/1998 | Moisio |
| 5,785,101 A * | 7/1998 | Wildey .................... 144/4.1 |
| 5,887,635 A | 3/1999 | Hamby, Jr. |
| 6,135,175 A | 10/2000 | Gaudreault et al. |
| 6,202,719 B1 | 3/2001 | Ketonen |
| 6,318,425 B1 | 11/2001 | Niemi |
| 6,622,761 B1 * | 9/2003 | Paakkunainen et al. .. 144/24.13 |

FOREIGN PATENT DOCUMENTS

| | | |
|---|---|---|
| CA | 1283025 | 4/1991 |
| WO | WO 97/17834 | 5/1997 |
| WO | WO 01/47672 A1 | 7/2001 |
| WO | WO 03/011011 A2 | 2/2003 |

* cited by examiner

Primary Examiner—Derris H. Banks
Assistant Examiner—Shelley Self
(74) Attorney, Agent, or Firm—Antony C. Edwards

(57) ABSTRACT

A log delimbing processor includes two pairs of grapples for holding workpieces for translation along their length so as to engage delimbing knives. The workpieces are urged by a pair of driven wheels on opposite sides of the workpieces, by a driven upper roller mounted to a backbone of the processor, and by a driven lower roller mounted on the end of an articulated arm which is actuated to tuck up under the workpieces held in the grapples so that the workpieces are engaged and driven from all sides. A swing out saw on one end of the processor provides for delimbing large forked branches.

15 Claims, 15 Drawing Sheets

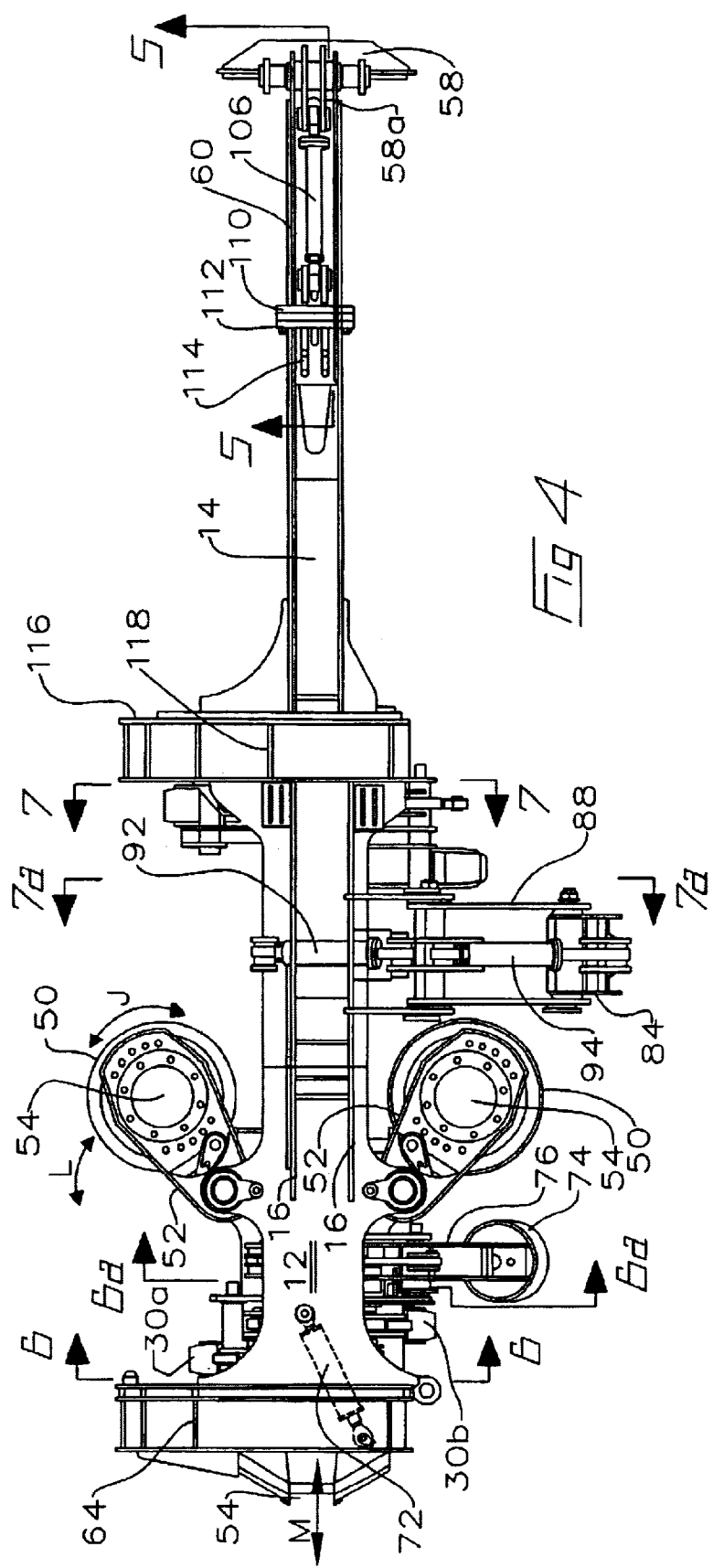

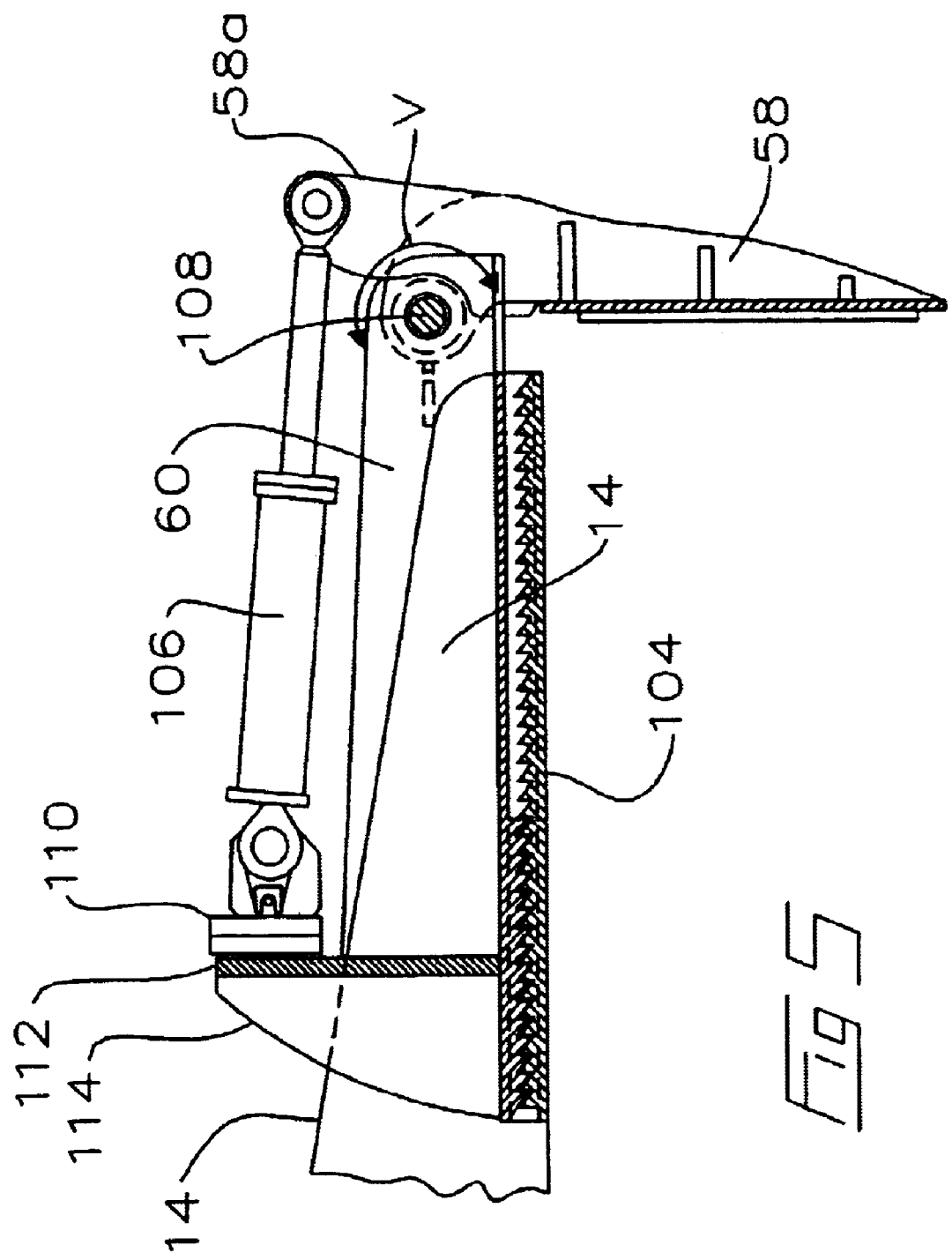

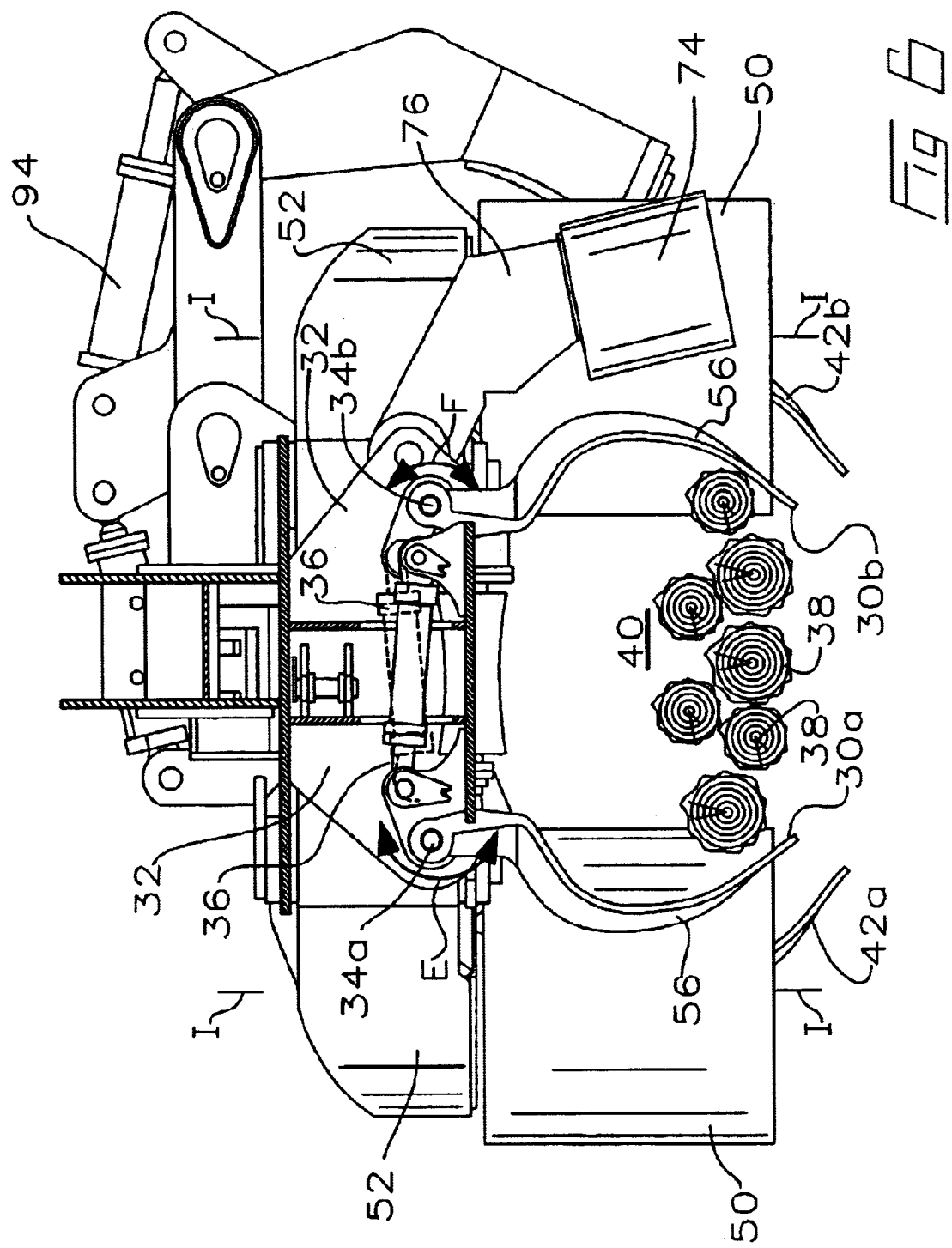

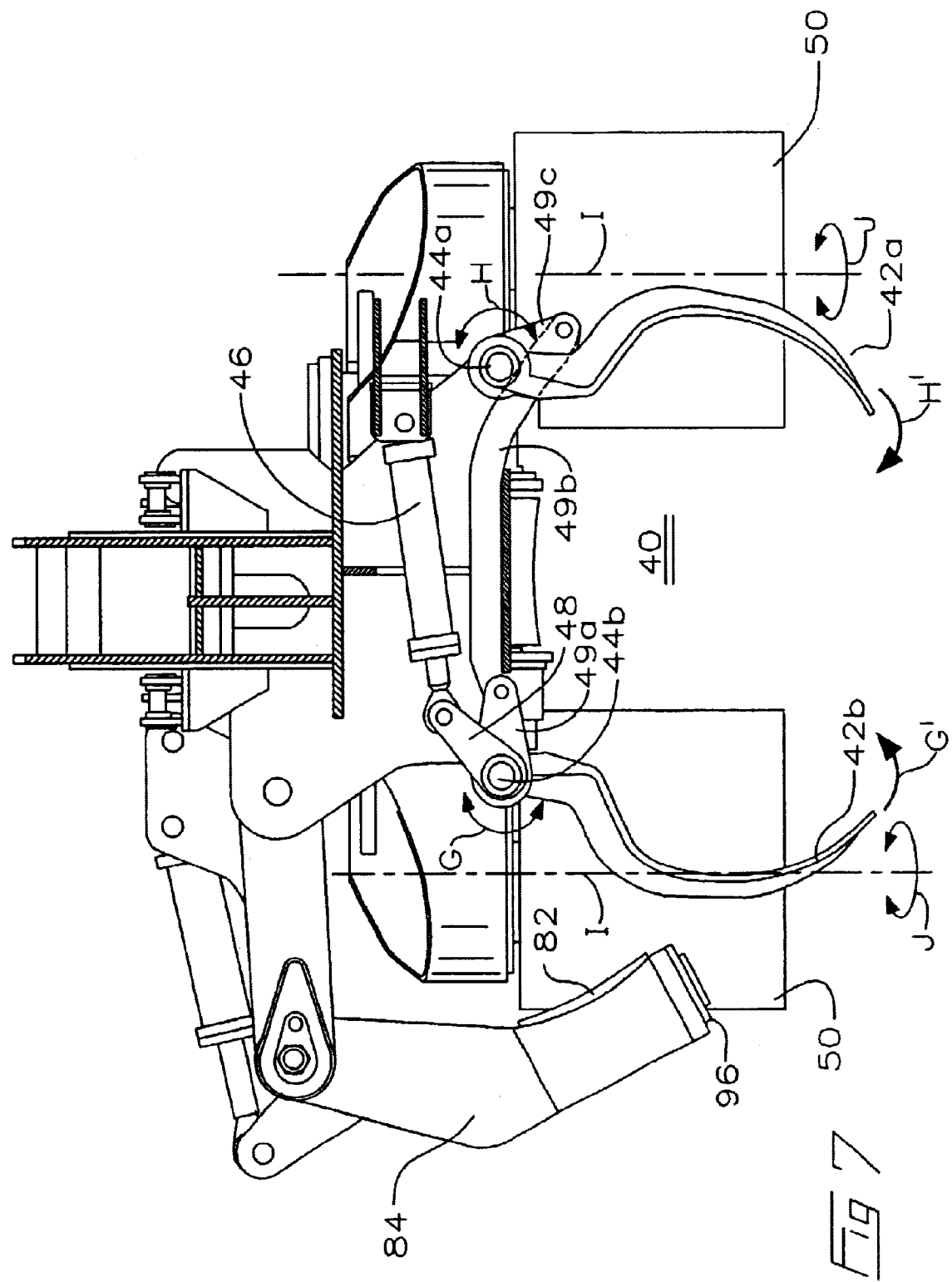

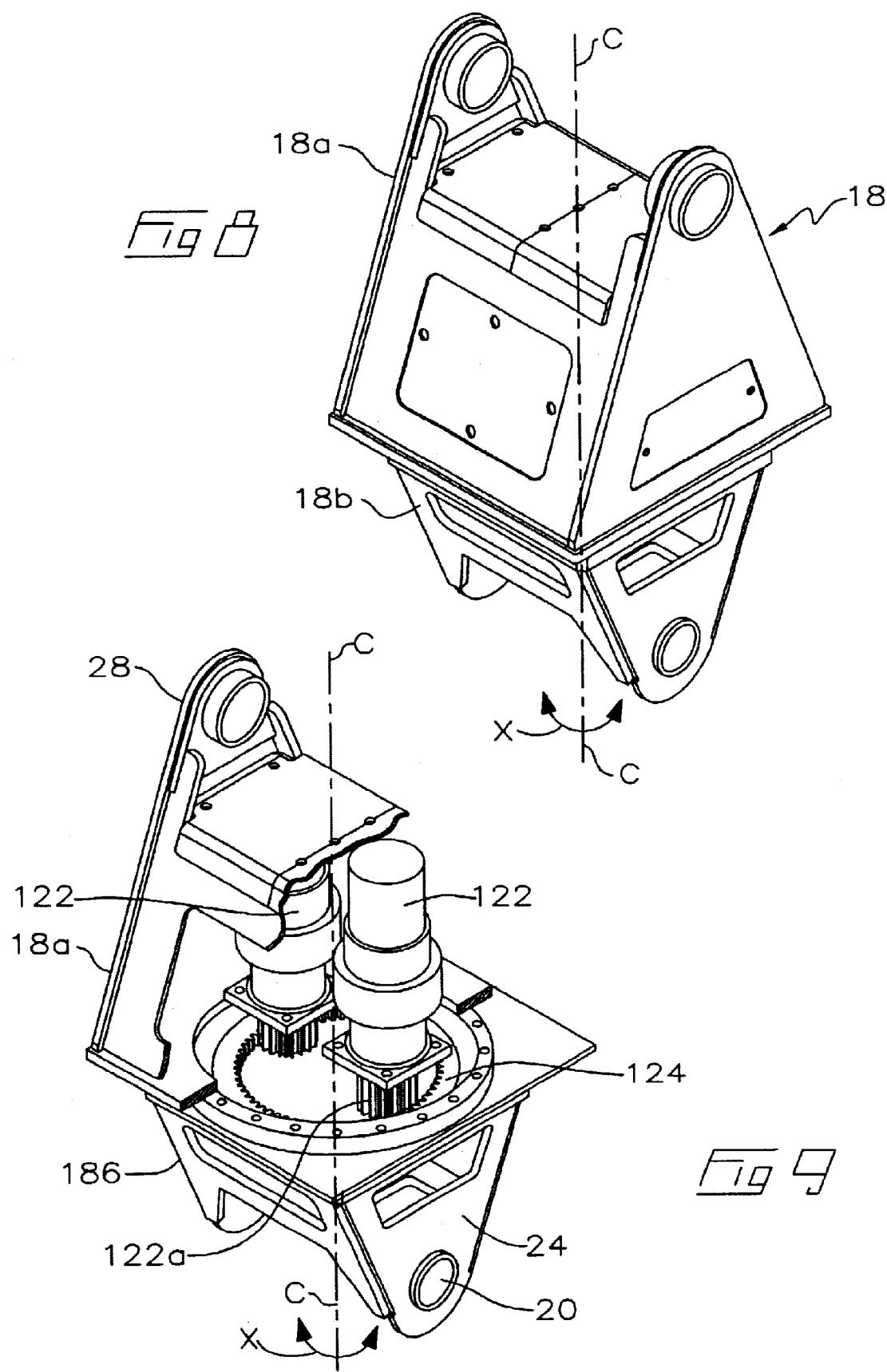

TREE PROCESSOR

FIELD OF THE INVENTION

The present invention relates to a tree processor attachment for vehicles such as excavators which have an articulated boom and a wrist coupling at the end of the articulated boom to which a tree processing head is mounted for the delimbing and cutting to length of a felled tree.

BACKGROUND OF THE INVENTION

As taught in U.S. Pat. No. 4,974,648 which issued to Propst on Dec. 4, 1990, lopping implements have been suspended from a suitable lifting tackle which is mounted on a separate chassis. The lopping implements are lowered onto a felled tree. As the implement is lowered, the grippers are open and they subsequently engage the tree trunk from below and hold and guide it as it is processed. When the implement has been applied to the tree trunk and has subsequently been raised, the feeding means move the tree past knife edges facing opposite to the feeding direction and which may be secured to separate toolholders or directly to gripper arms. As a result, the tree is lopped throughout the periphery of the tree trunk as the tree is pulled through the implement. A cross-cutting device may optionally be provided for cross-cutting the tree trunk when the tree has been lopped so that felled trees can efficiently be treated.

As discussed in Canadian Patent No. 2,162,183, which issued to Kingston on Aug. 11, 1998, modern tree harvesting operations generally comprise equipment such as a land vehicle with large diameter wheels or a pair of crawler tracks. The vehicle is generally equipped with a multi-function tree processing apparatus mounted at the end of an articulated boom. The tree processing apparatus may fell a tree, delimb it and sever or buck the tree trunk into sawmill length logs in a single sequence of operation.

In the prior art, applicant is aware of multi-function tree processing apparatus such as disclosed in U.S. Pat. Nos. 4,766,939, issued on Aug. 30, 1988 to Forslund, and U.S. Pat. No. 5,219,010 issued on Jun. 14, 1993 to Eriksson. Examples of conventional delimbing machines are described in U.S. Pat. No. 4,276,918 which issued on Jul. 7, 1981 to Sigouin, and in U.S. Pat. No. 4,382,457 which issued on May 10, 1983 to Hahn. Sigouin discloses a sliding boom mounted atop a track type excavator. The sliding boom is used to delimb, to cut the top portion of full length trees, and to pile those trees awaiting further processing by a severing machine. Hahn discloses a machine having an articulated boom, a pair of sliding delimbing blades, a tree trunk severing saw, and a log sorting mechanism with two cradles to separate sawmill logs from pulpwood.

A variety of delimbing attachments have been developed to operate in combination with an articulated boom of a log loader. For example, U.S. Pat. No. 4,899,794 which issued on Feb. 13, 1990 to Hamby, Jr. and U.S. Pat. No. 5,406,997 which issued on Apr. 18, 1995 to Davison, disclose a tree delimbing device where the tree is drawn through a pair of limb stripping blades by the grapple of a log loader.

Another type of tree delimbing attachment for use in cooperation with an articulated loader boom is illustrated in U.S. Pat. No. 4,167,960 which issued on Sep. 18, 1979 to Wildey, and in U.S. Pat. No. 5,293,914 which issued on Mar. 15, 1994 to Hudson. In both the Wildey and Hudson devices, there is provided a pair of delimbing blades and a tree topping mechanism.

As discussed in U.S. Pat. No. 6,371,177 which issued to Larente on Apr. 16, 2002, the felling and harvesting of timber is not an easy task, especially for larger trees. The timber industry is continually in search of better and faster methods to harvest and process felled trees. One necessary task in the harvesting of trees is often the removal of pieces of the tree. For the timber industry, the most useful, and therefore most important part, of the tree is the healthy trunk with a mostly uniform diameter. Thus, other parts of the tree, such as its branches, are not as important and can be discarded. Another part of the tree than can be discarded is its top. Applicant has also been faced with the problem of having to remove one branch of a "Y" in a tree, which according to some current governmental regulations, must be trimmed within close tolerances of the remaining trunk of the tree.

Finally, as discussed in the prior art by Oilund in his U.S. Pat. No. 6,516,841 which issued on Feb. 11, 2003, for a tree felling and shaping apparatus, generally, a tree felling and shaping machine has a tree processor head which includes a central post, a cutting device at the bottom of the central post, and gripper and stripping means attached to the central post. The tree felling and shaping machine generally has a boom mounted to a vehicle and the tree processor head is typically mounted to the boom with a joint link system which as at least two degrees of freedom. The head can be tilted toward, or away from the machine about a first axis transverse to the boom. The head may also be tilted side to side about a second transverse axis, which is generally longitudinal to the boom when the head is upright, or may be pivoted about a second transverse axis which is at an angle from the first axis. These two degrees of freedom allow the head to be aligned with a tree that is not perfectly vertical. After the tree has been cut the head can be tilted about the first axis to move relative to the bottom of the machine to lay trees down transversely to the bottom for processing. During the processing period the tree processor head is in a generally horizontal position.

In other prior art of which applicant aware, in U.S. Pat. No. 3,074,446 which issued to Earl on Jan. 22, 1963, a machine for harvesting trees is disclosed in which a U-shaped jaw is placed around a standing tree and groups of grippers mounted on the jaw, taught to be four groups radially spaced apart around the tree, move into the jaw opening to clamp the tree, and when open leave the opening into the jaw unobstructed, the machine including a tree delimbing device and means including the grippers for moving the tree lengthwise of the jaw past the delimbing device while the grippers hold the tree.

Applicant is also further aware of U.S. Pat. No. 4,239,067 which issued Dec. 16, 1980 to Mononen for an apparatus for bulk-lopping, bucking and pre-stacking in forest harvesting, the apparatus including roll units fixed to a frame as well as roll units moveably mounted on the frame, the latter being moveable between a first open position for receiving tree trunks engaged by lifting and lopping arms and a second closed position defining an adjustable feeding pocket. Lopping blades on the arms lop limbs from the trunks as the trunks are fed through the feeding pocket under the action of the feed roll units. In particular, two longitudinally adjacent pairs of feed rollers are provided, each pair of feed rollers being in opposed relationship to each other upon the feed roll units being pivoted to their closed position.

Applicant is also aware of U.S. Pat. No. 5,148,843 which issued Sep. 22, 1992 to Côté for a tree delimber with tree feeding means. The tree delimber of Côté includes a telescoping boom, tree gripping means mounted on the front end of the boom and tree delimbing means and tree feed means mounted on the sleeve into which the boom telescopes. The tree feed means includes three feed rollers, one roller fixed on the sleeve and the other two rollers moveable toward each other and the one roller to hold a tree between all three rollers so as to feed the tree. The two rollers which are moveable towards each other are rotatably mounted on arms which in turn are pivotally mounted so as to engage the rollers with a tree held within a longitudinal passageway and up against the one roller rotatably mounted at the top of the passageway. The rollers thus may tightly grip a tree or, when the two arm mounted rollers are rotated from under the passageway, the tree within the passageway is released downwardly from being clamped within the rollers.

SUMMARY OF THE INVENTION

The present invention is a tree processor for delimbing and cutting to a desired length of at least one workpiece simultaneously. The tree processor may in a preferred embodiment include an elongate rigid support member having first and second opposite ends. A coupling means is mounted to an upper side of the support member for mounting of the support member to a work arm wrist coupling, such as an actuable coupling on the stick of an excavator.

Selectively actuable first and second pairs of grapple arms are mounted, respectively, to the first and second ends of the support member. The first and second pairs of grapple arms are mounted laterally across, and depend downwardly from, the support member. They are selectively actuable between open positions for entry and exit of workpieces to and from between the pairs of grapple arms, and closed positions clamped around workpieces. When in the closed positions the grapple arms thereby define a workpiece processing pathway extending longitudinally under the support member. The processing pathway thus has lateral boundaries and a lower boundary. The pairs of grapple arms when in the closed positions cradle the workpieces longitudinally under the support member.

A pair of selectively actuable drive wheels are mounted on selectively actuable first pivot arms. The first pivot arms are pivotally mounted to the support member so as to dispose each drive wheel of the pair of drive wheels downwardly of the support frame. They are laterally spaced apart by a selectively adjustable lateral distance apart on the lateral boundaries of the processing pathway for sandwiching therebetween the workpieces when in the processing pathway. The pair of selectively actuable drive wheels are translated laterally inwardly to engage, and rotate cooperatively to urge, the workpieces in substantially linear translation longitudinally along the processing pathway so that the workpieces in the processing pathway are delimbed by at least one of the first and second pairs of grapple arms cradling the workpieces.

Preferably, a selectively actuable upper drive means, such as a driven roller, is rotatably mounted to an underside of the support member so as to extend into the upper extremity of, for urging the workpieces along, the processing pathway. A selectively actuable lower drive means, such as a driven roller, is rotatably mounted to a lower end of a second pivot arm pivotally mounted to the support frame. The second pivot arm rotates in a plane perpendicular to the longitudinal axis of the pathway so as to translate the lower drive means between an open retracted position retracted from under, so as to be clear of, the processing pathway, and a closed, engaged position wherein the lower drive means extends up into, from under, the lower boundary of the processing pathway to engage and urge a lower surface of the workpieces along the pathway.

In one embodiment not intended to be limiting, a rigid boom extends longitudinally from, and is mounted to, the second end of the support member. A rigid butt plate may be rotatably mounted to a distal end of the boom, distal from the support member, so as to be selectively pivotable into a stop position extending rigidly across the processing pathway. The butt plate provides a workpiece stop at a second end of the processing pathway at a preset, and in a preferred embodiment, adjustable distance along the processing pathway. The butt plate may be mounted to the boom by a selectively telescoping boom extension for adjusting a preset distance between the butt plate and the sawing means. The butt plate may be selectively pivotable, by a butt plate pivot means, between an elevated position so as to be removed from stopping the workpieces translating from the second end of the support member along the processing pathway, and the stop position across the processing pathway.

A selectively actuable sawing means, such as a hydraulic chainsaw, is mounted to the first end of the support member for lateral sawing in a sawing plane, which may be vertical, laterally through the workpieces when in the pathway. The sawing means may preferably be pivotally mounted, by selectively actuable pivot means, to the first end of the support means for selectively pivoting the sawing means and the sawing plane about a substantially vertical axis of rotation so that the sawing plane includes, as it rotates so as to sweep out, planes other than only a plane perpendicular to the longitudinally extending processing pathway. The sawing plane may be pivotable so as to sweep out fifty-five degrees between the delimbing orientation and the perpendicular orientation. That is, the selective pivoting of the sawing means about the vertical axis of rotation pivots the sawing plane between a non-perpendicular delimbing orientation and a perpendicular orientation. The delimbing orientation is for removing a branch, for example a very thick branch or one or more forked branches (collectively claimed as "forked branches") of a workpiece held in the processing pathway. In the perpendicular orientation the sawing plane is perpendicular to a longitudinal axis of the pathway for sawing a workpiece held in the processing pathway, for example abutted against the butt plate, or otherwise at a desired length as measured by a distance sensor such as a metered roller. When the workpiece is stopped against the butt plate the length of the sawn workpieces is equal to a preset distance between the sawing means and the butt plate.

The second pair of grappling arms, when in the open position for accepting the workpieces into the processing pathway, may define an opening between distal ends of the second pair of grappling arms which is larger than a corresponding opening between distal ends of the first pair of grappling arms when in the open position.

The coupling means may be mounted to the support member so that the support member balances about the coupling means with the second end of the support member inclined downwardly below the first end. For example, the second end may be inclined downwardly by generally fifteen degrees from the first end.

Each of the drive wheels of the pair of drive wheels and the upper and lower drive means have corresponding independently actuable motors each providing an independent actuating force to independently urge the workpieces along the processing pathway. Sensor means may be provided to detect slipping rotation of any of the drive wheels or drive rollers slipping in their engagement with the workpieces and to reduce the actuating force corresponding to the slipping rotation to reduce marring of the workpiece surfaces.

BRIEF DESCRIPTION OF THE DRAWINGS

FIG. 4 is, in plan view, the tree processor of FIG. 1.

FIG. 5 is a sectional view along line 5—5 in FIG. 4.

FIG. 6 is a sectional view along line 6—6 in FIG. 4.

FIG. 7 is a sectional view along line 7—7 in FIG. 4.

FIG. 8 is, in perspective view, the wrist coupling between the tree processor of FIG. 1 and the actuable work arm of the vehicle to which the tree processor is mounted.

FIG. 9 is, in partially cut away perspective view, the wrist coupling of FIG. 8.

DETAILED DESCRIPTION OF EMBODIMENTS OF THE INVENTION

Figure 1:
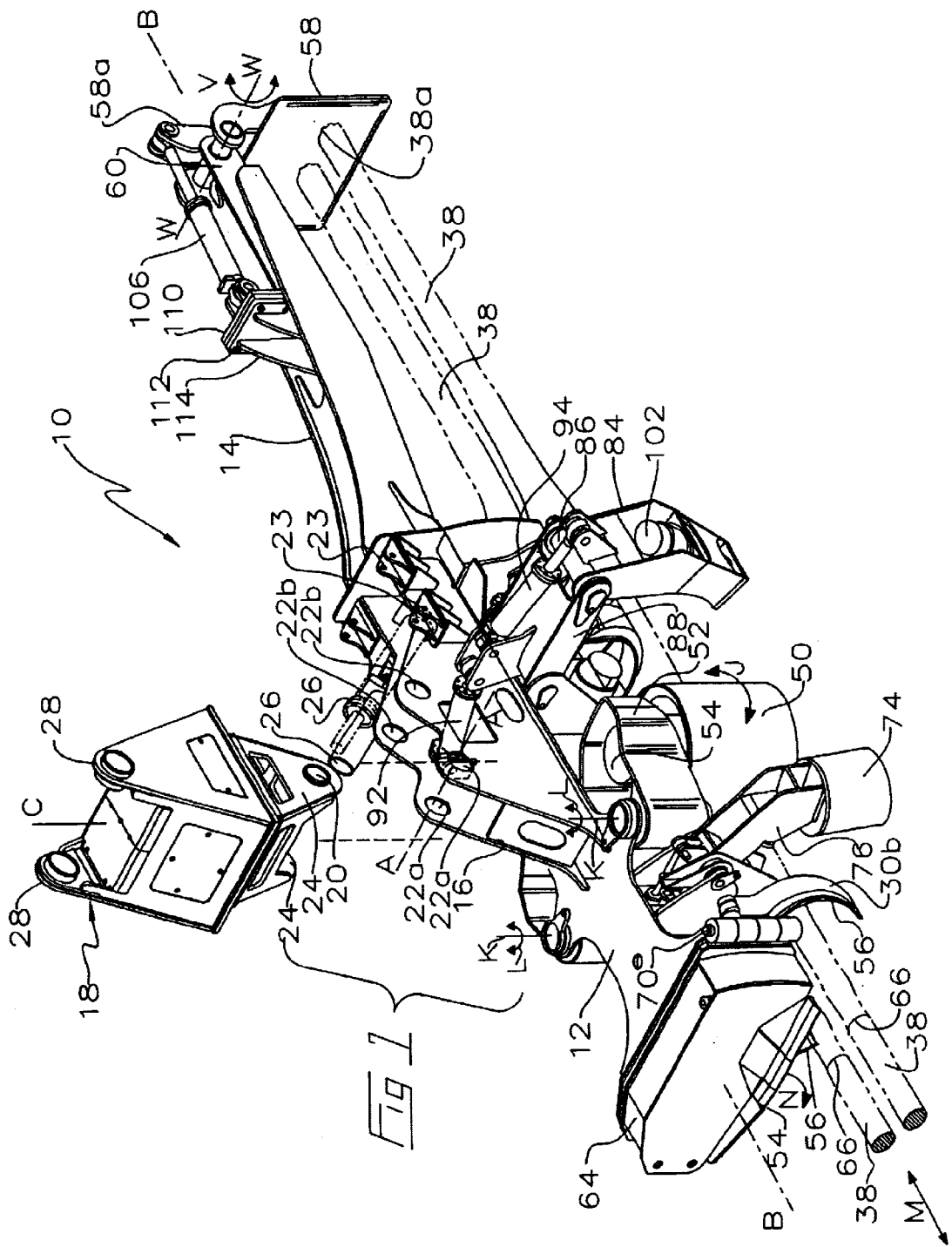
FIG. 1 is, in perspective view, the tree processor according to one embodiment of the present invention.

With the reference to the drawings wherein similar characters of reference denote corresponding parts in each view, the processor 10 according to the present invention, being only one embodiment which is intended to be illustrative rather than limiting, in FIG. 1 includes a longitudinal support frame or backbone 12 of the processor. Support frame 12 may be a modified box beam. The top surface of the beam may be a laterally extending plate which, as illustrated may be a top plate to which at one end is mounted a longitudinally extending boom 14, and on top of which is rigidly mounted a coupling mount 16. Coupling 18 is, at its lower end, mountable to coupling mount 16. For example, coupling 18 may be mounted to coupling mount 16 by a shaft 20 journalled one pair of the fore or aft pairs of apertures 22a or 22b in coupling mount 16 and corresponding apertures in brackets 24 on coupling 18. A selectively actuable pair of actuators 26 extend from coupling 18 to corresponding mounting brackets 23 rigidly mounted to coupling mount 16. Actuators 26 provide for rotational movement about axis A (shown only through apertures 22a) and shaft 20 of support frame 12 relative to coupling 18. Coupling 18 is mounted to the distal end of a work arm, for example, the end of the stick and boom of an excavator (not shown). Coupling 18 is mounted relative to support frame 12 so that support frame 12 and boom 14 may be rotated both in a plane containing longitudinal centroidal axis B and vertical centroidal axis C, and, by actuation of the rotatable coupling with coupling 18 as better described below, about axis C.

Log clamping arms and log motivating drive means which surround the workpieces top, bottom and both opposite sides, are mounted to support frame 12. In particular, and without intending to be limiting, a first cooperating pair of clamping arms 30a and 30b are pivotally mounted to support frame 12 by means of corresponding brackets 32. Arms 30a and 30b may be pivoted in directions E and F about pinned couplings 34a and 34b by actuation of corresponding hydraulic actuators 36 coupled to upper ends of their respective clamping arms 30a and 30b. Thus actuation of hydraulic actuators 36 causes clamping arms 30a and 30b to either grasp or release trees 38 held longitudinally within a working cavity 40 defining a processing pathway between the concave faces of those clamping arms and those of a second pair of clamping arms 42a and 42b also pivotally mounted to support frame 12, parallel to and spaced apart from clamping arms 30a and 30b.

Clamping arms 42a and 42b are pivoted in directions G and H about pins 44a and 44b so as to simultaneously open or close their pincer action in directions G' and H' by the actuation of corresponding hydraulic actuator 46 acting on lever arm 48 rigidly mounted to corresponding clamping arm 42b. Rotation of lever arm 48 simultaneously rotates crank arm 49a. Crank arm 49a is pinned as a pivotal linkage to cross arm 49b. Cross arm 49b is pinned as a pivotal linkage to crank arm 49c. Thus rotation as crank arm 49a also simultaneously rotates crank arm 49c. Rotation of crank arm 49c rotates clamping arm 42a about pin 44a. Thus clamping arms 42a and 42b may be opened so as to release, or closed so as to loosely clamp or cradle between the concave faces of the clamping arms, workpieces such as trees 38 residing within working cavity 40. The front and rear pairs of clamping arms may be opened and closed between ranges allowing for the picking up of large bundles of logs and single thin logs. For the former, the front pair of arms may be opened so that the opening between the ends of the arms may be for example 22 inches. For the latter, the rear pair of arms may be opened so that the opening between the ends of the arms may be for example 32 inches. When closed, the pairs of arms may be brought up against the frame so as to hold a single thin tree or log, for example having a diameter of merely inches. Thus processor 10 may be recumbently positioned by the operator of the excavator to which the processor is mounted, so as to drop the two pairs of clamping arms, when opened, down onto workpieces such as a tree or plurality of trees for example resting in a pile or deck on the ground, and to grasp the tree or plurality of trees by closing both pairs of clamping arms. Once the pairs of clamping arms are closed so as to grasp trees 38 within working cavity 40, processor 10 may be raised so as to free trees 38 from contact with the ground.

A pair of drive wheels 50 such as the rubber encased cylindrical steel drive wheels presently used in conventional log processors as would be known to one skilled in art, or the improved drive wheels of my corresponding U.S. Patent Application No. 60/445,226 incorporated herein by reference, are mounted on opposite sides of working cavity 40. Each drive wheel 50 is rotatably mounted to a pivotable arm 52 so as to depend downwardly from the pivotable arm. Hydraulic motors 54 are mounted between pivotable arms 52 and corresponding drive wheels 50 so as to rotate each drive wheel 50 about its corresponding axis of rotation I in direction J. Each pivotable arm 52 is pivotable about its corresponding axis of rotation K for rotation of arms 52 in direction L. Rotation of arms 52 in direction L about axes of rotation K simultaneously translates drive wheels 50 in to, or out of, working cavity 40. In this manner, drive wheels 50 may be brought into frictional engagement with the laterally outermost surfaces of a tree 38 or a bundle of trees 38 held by the pairs of clamping arms within working cavity 40.

With the drive wheels 50 so engaged against trees 38, rotation of the drive wheels translates the trees in direction M parallel to longitudinal centroidal axis B. As the trees are translated in direction M, an upper knife 54 and the knife-like edges 56 on clamping arms 30a and 30b engage any branches protruding from the trees so as to de-limb the trees.

Once trees 38 are de-limbed, they may be driven so as to abut their ends 38a against butt plate 58 mounted on the distal end of boom telescoping members 60 telescopically mounted onto boom 14 as better described below. With butt plate 58 articulated down so as to be perpendicular to longitudinal centroidal axis B, and with trees 38 abutted against butt plate 58, and with butt plate 58 preset a desired distance away from support frame 12 and in particular preset a desired distance from chainsaw 62, hydraulically actuated chainsaw 62 may be rotated downwardly in direction N from within chainsaw housing 64 thereby cutting trees 38 into a predetermined desired length across sawing lines 66.

Figure 2:
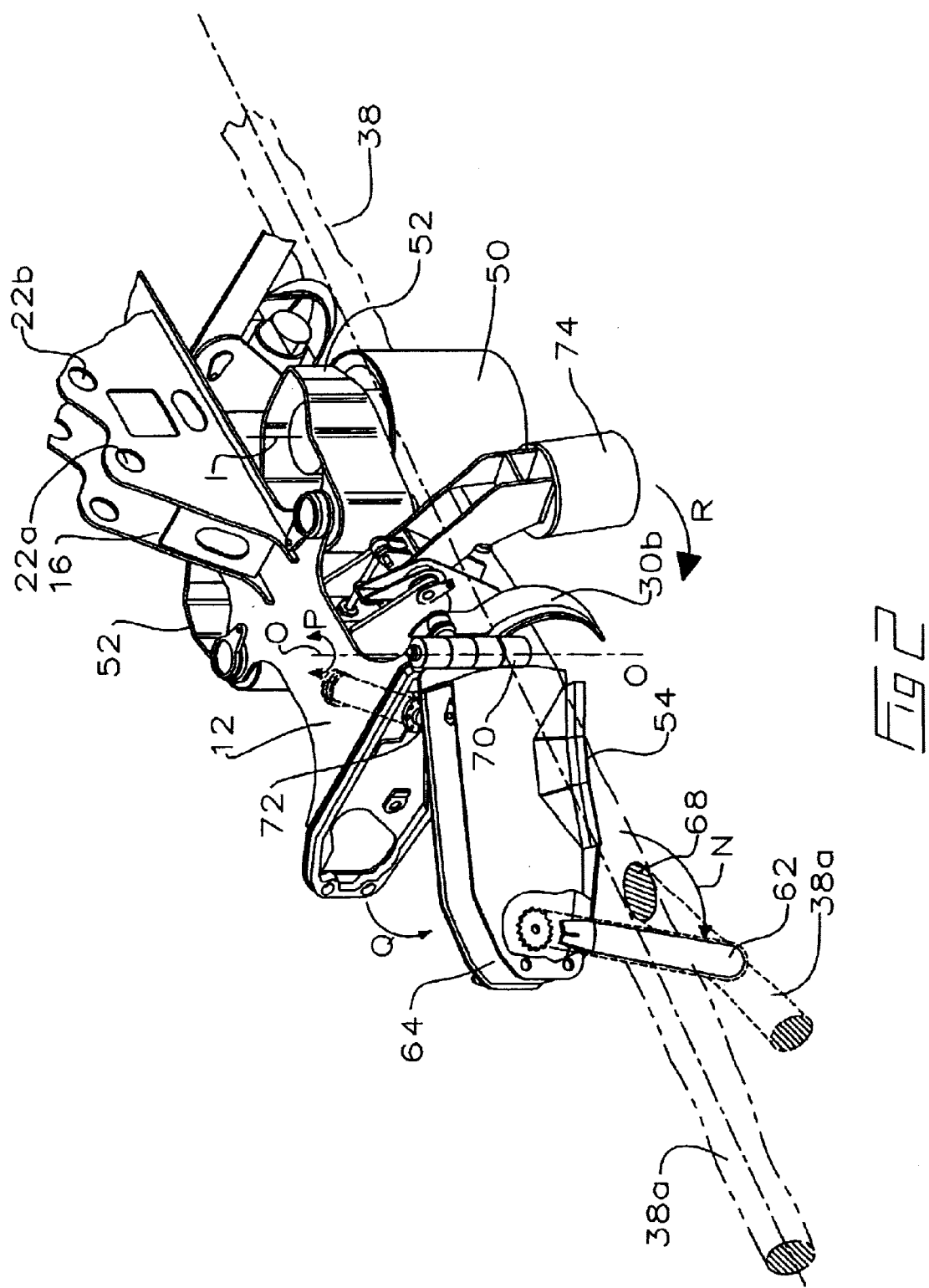
FIG. 2 is, in partially cut away enlarged view, the tree processor of FIG. 1 illustrating the swing-out saw in its deployed position.
Figure 3:
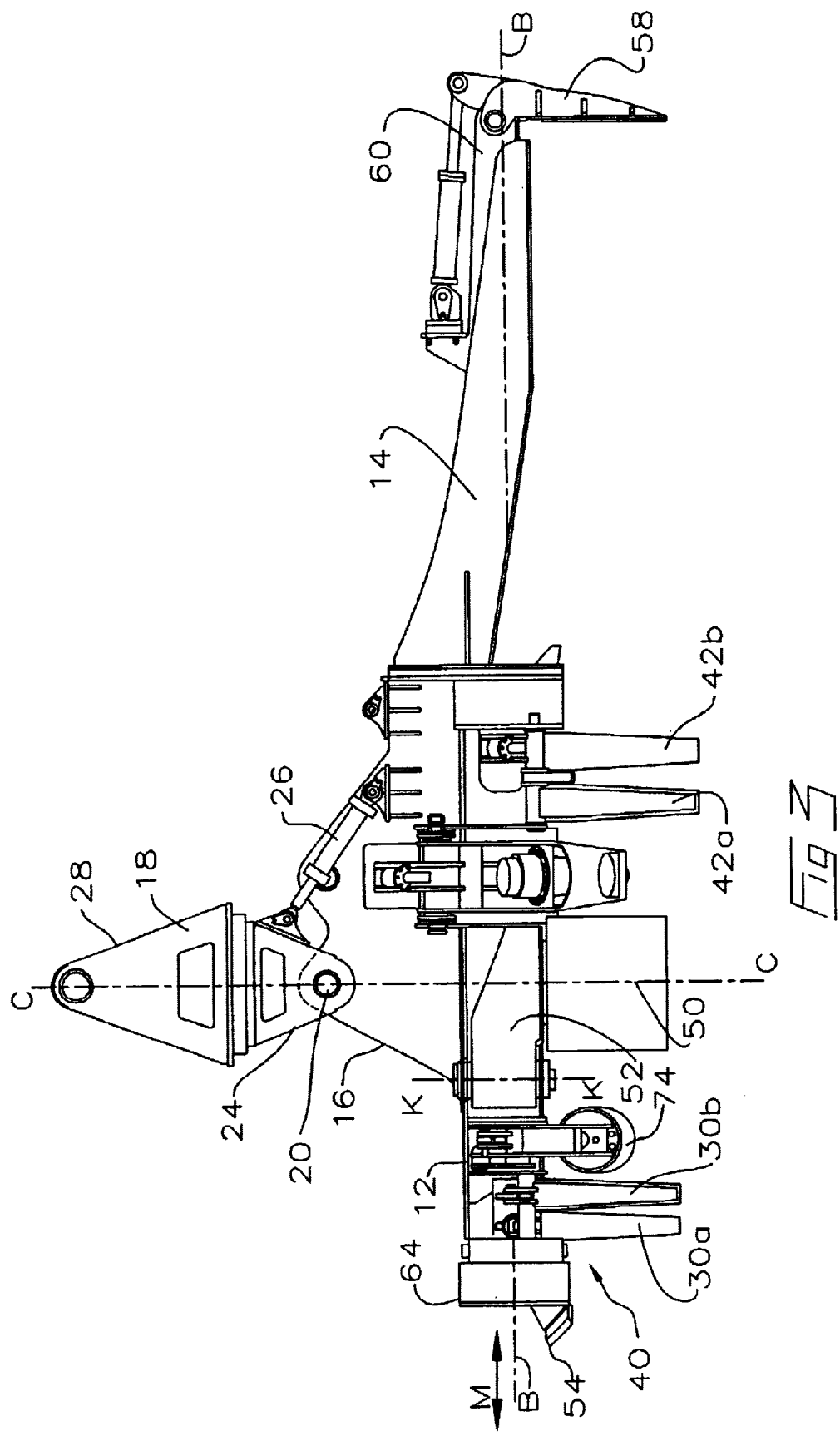
FIG. 3 is, in side elevation view, the tree processor of FIG. 1.
Figure 3A:
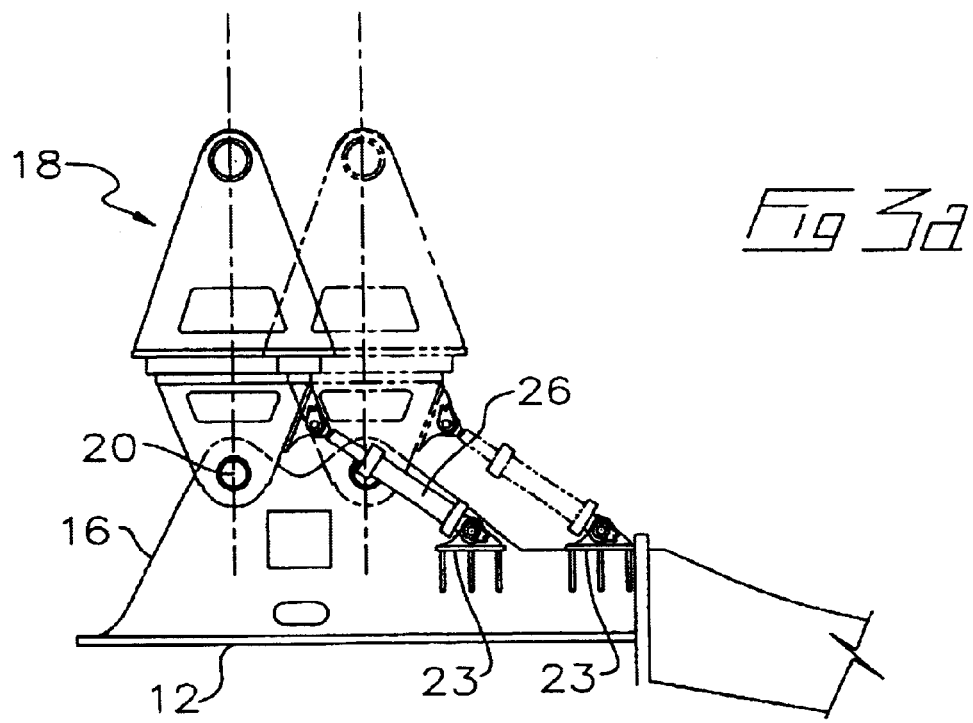
Figure 3B:
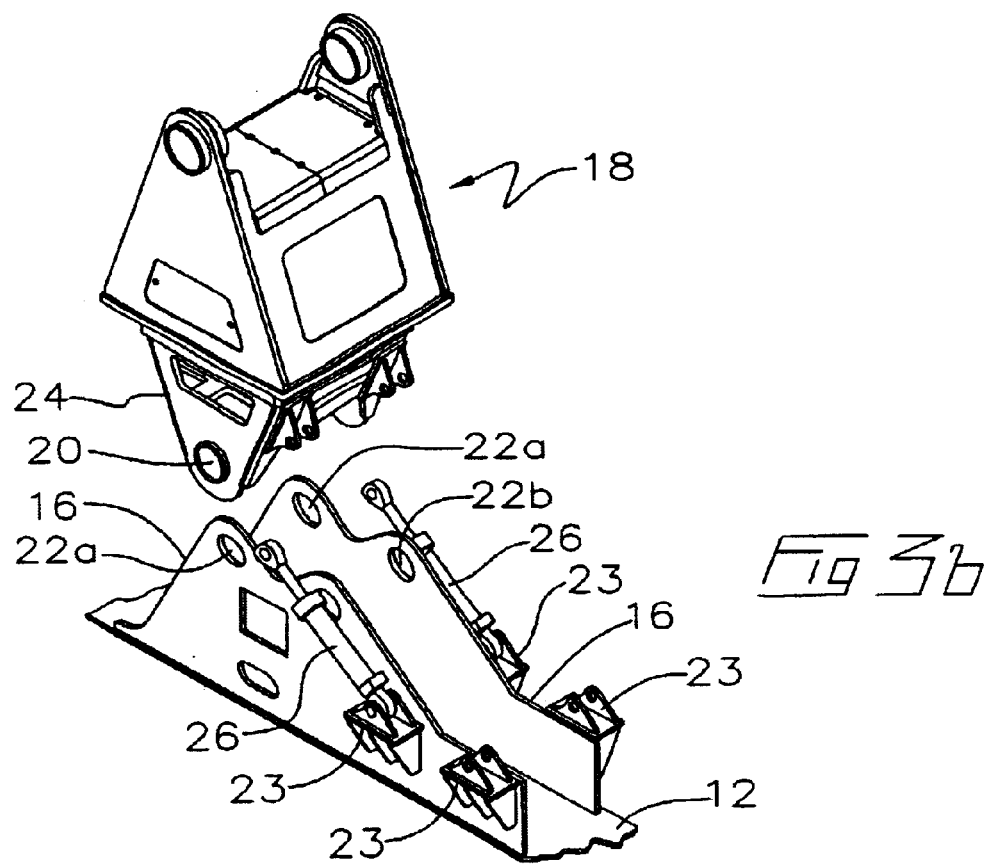
Figure 4A:
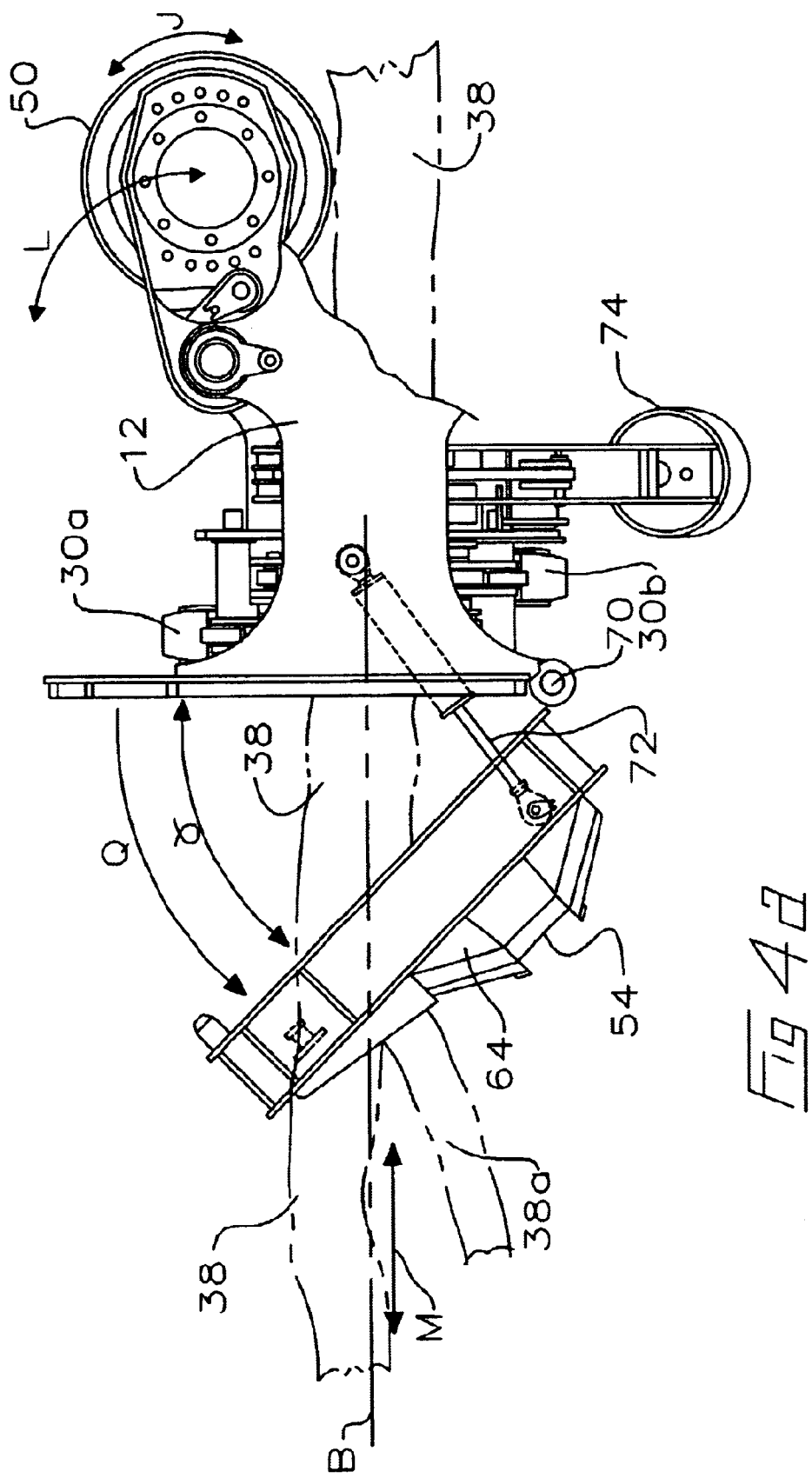
FIG. 4a is, in enlarged partially cut away plan view, the tree processor of FIG. 2.
Figure 6A:
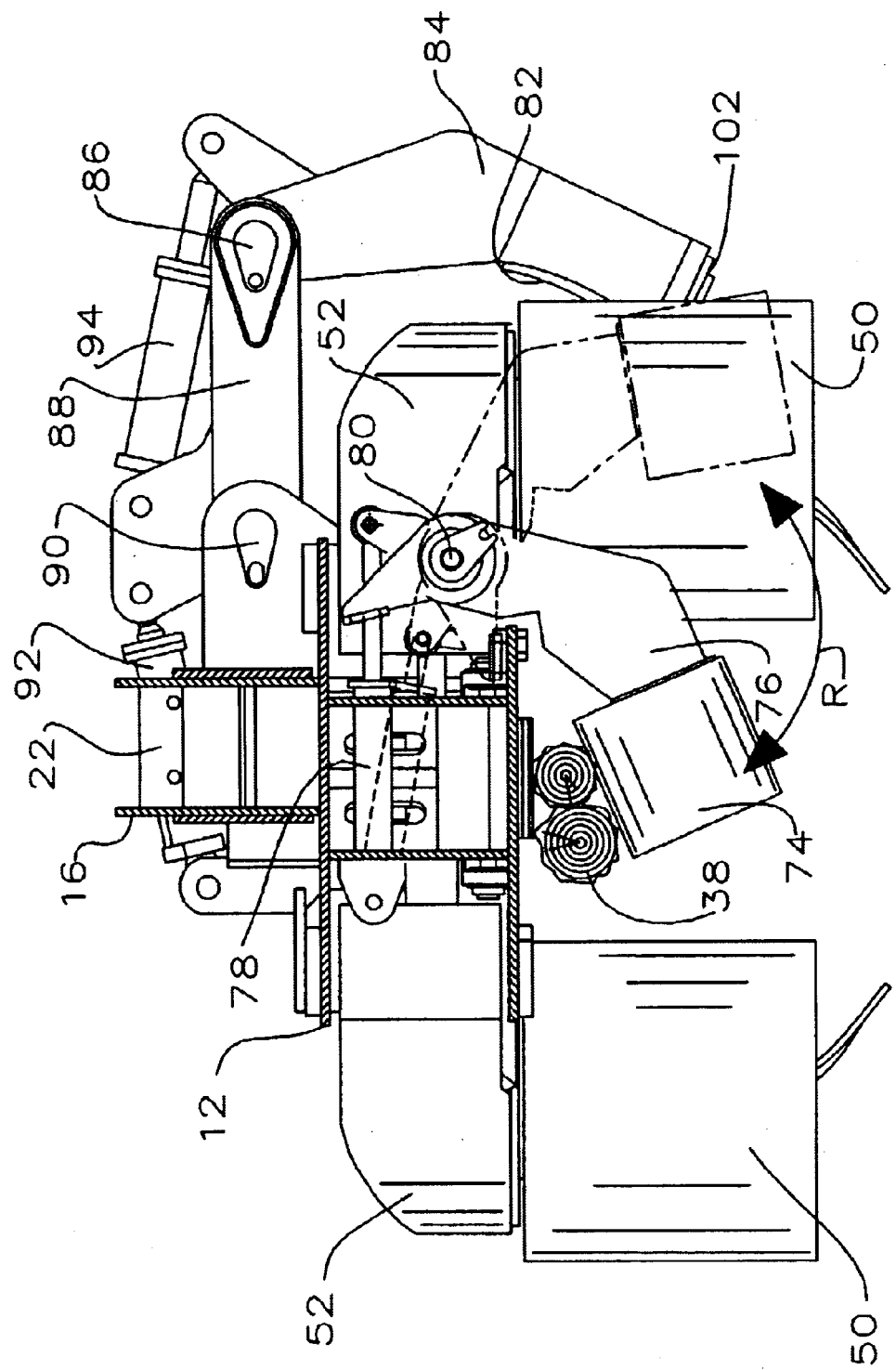
FIG. 6a is a sectional view along line 6a—6a in FIG. 4.
Figure 6B:
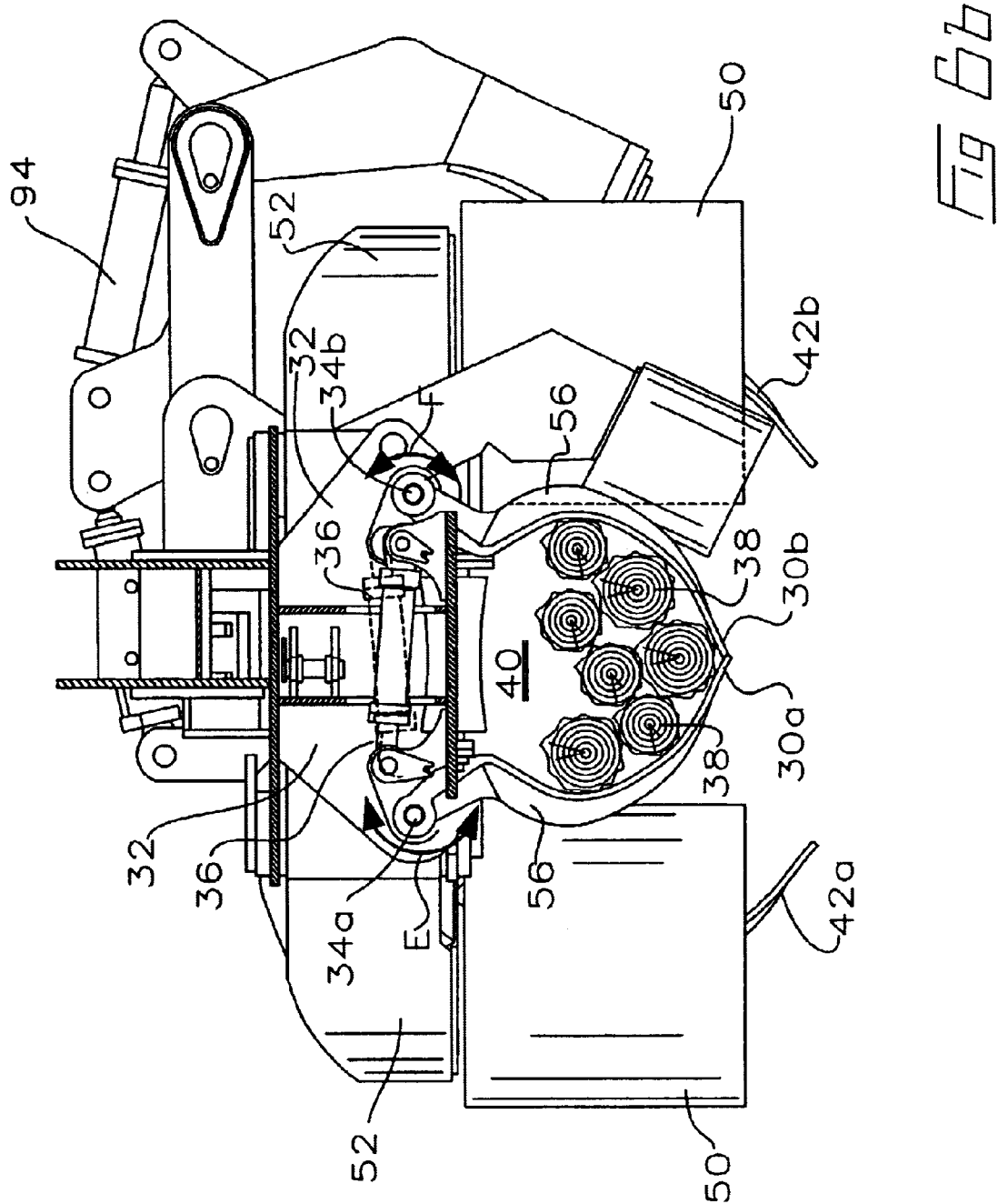
FIG. 6b is the view of FIG. 6 with the clamping arms partially closed around a large bundle of logs.
Figure 6C:
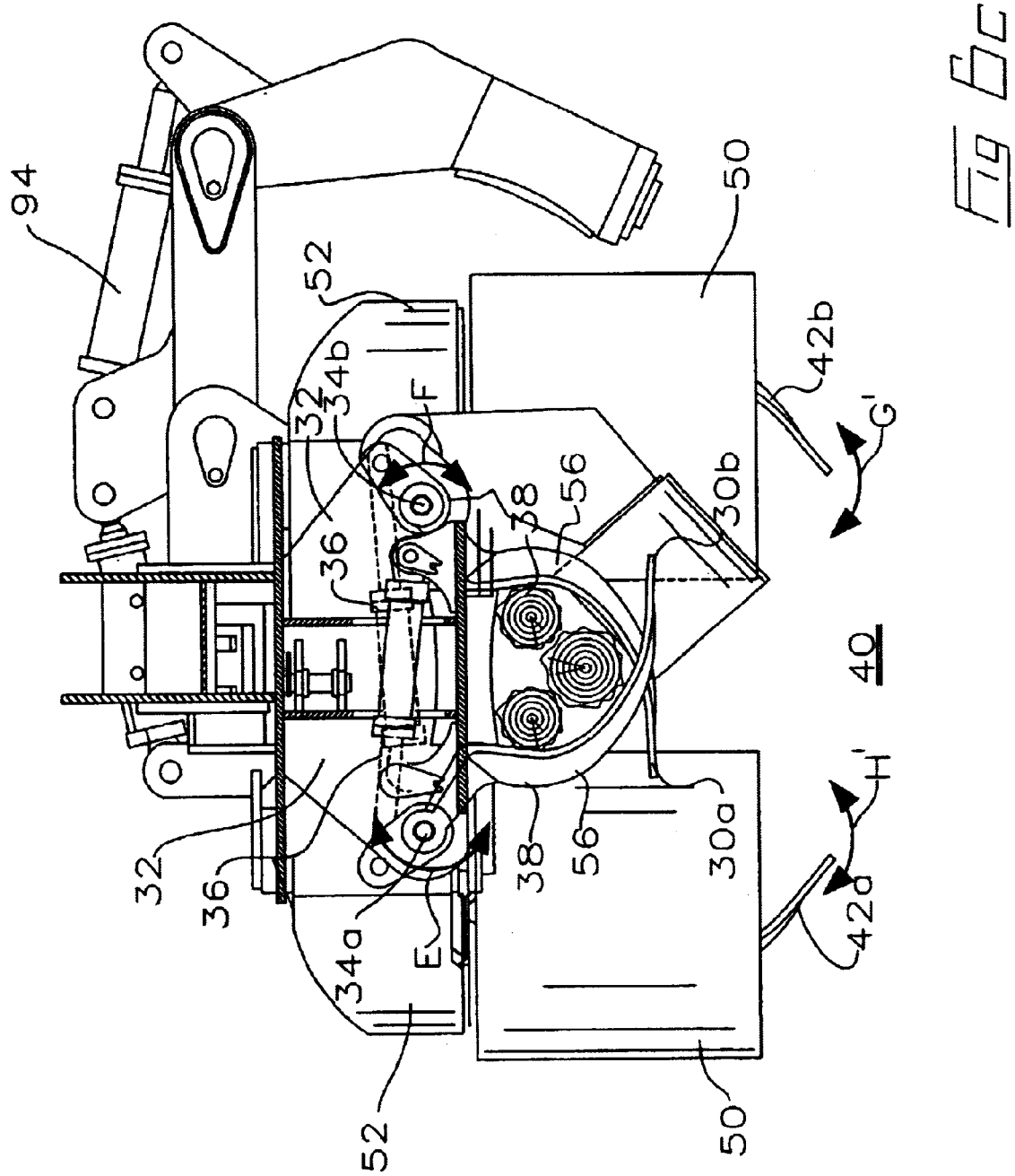
FIG. 6c is the view of FIG. 6 with the clamping arms partially closed around a smaller bundle of logs.

As best seen in FIGS. 2 and 4a, trees 38 may occasionally be a singular tree 38 having a generally Y-shaped branching at one end. In the past, trimming one of the branches such as branch 38a has been difficult, if not impossible with conventional log processors. Further, in some jurisdictions government regulations now require that a branch such as forked or Y-shaped branch 38a must be trimmed at its base within quite close tolerances. This close trimming is depicted in FIG. 2 by sawing line 68. In the present invention, to accommodate the sawing of branch 38a along sawing line 68, chainsaw housing 64 is pivotally mounted relative to support frame 12 by means of hinge 70. In particular, chainsaw housing 64 may be selectively pivoted about axis of rotation 0 for rotation in direction P. Hydraulic actuator 72 is mounted at one of its ends to support frame 12, and at its opposite end to the interior side of housing 64 so that by selective actuation of actuator 72, angle α between housing 64, that is, the alignment of the sawing trajectory of chainsaw 62 as it rotates down in direction N, may be varied between for example zero and fifty-five degrees. An operator may thus assess the required angle to produce sawing line 68 according to the required tolerances so as to remove branch 38a, and then swing chainsaw 62 and housing 64 in direction Q into that orientation prior to actuating chainsaw 62 in direction N from within housing 64.

A length metering roller 74 is rotatably mounted on pivotable arm 76 pivotally mounted to support frame 12. Actuator 78 rotates arm 76 about pin 80 so as to drive roller 74 in direction R into engagement with the underside of trees 38. Metering roller 74 measures how long a length of trees 38 have been delimbed so that chainsaw 62 may be actuated to cut a tree to a desired length without having to necessarily have the tree abut the butt plate 58.

Figure 7A:
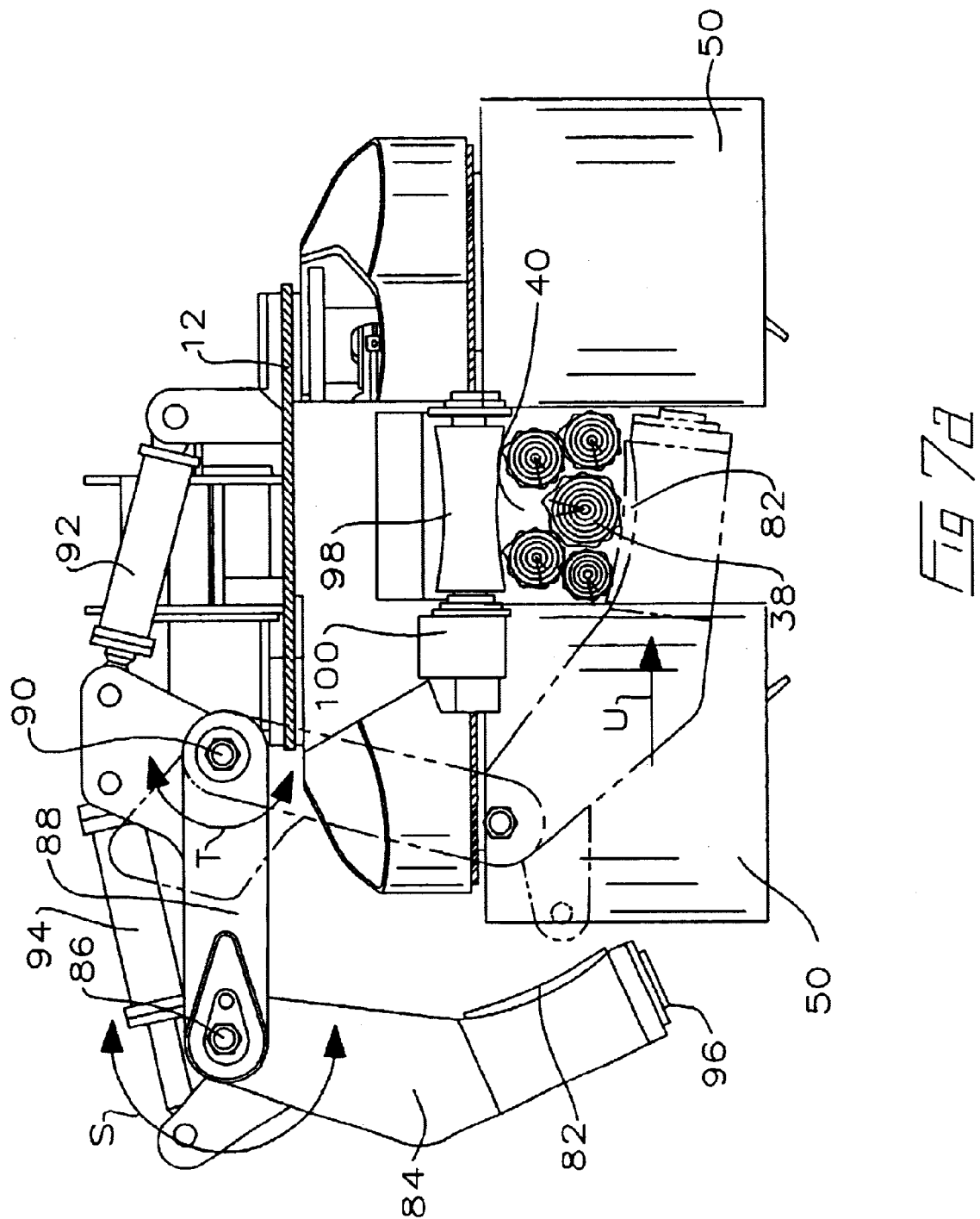
FIG. 7a is a sectional view along line 7a—7a in FIG. 4.

As best seen in FIG. 7a, drive roller 82 is rotatably mounted on the distal end of arm 84 for rotation in direction S about pin 86. Pin 86 is a rotatable coupling between arm 84 and arm 88, the laterally inboard end of arm 88 being pivotally mounted to support frame 12 about pin or shaft 90 so that actuation of hydraulic actuator 92 rotates arm 88 in direction T. Actuation of actuator 94 drives rotation of arm 84 in direction S so that pin 90 acts as a rotatable shoulder coupling and pin 86 acts as a rotatable elbow coupling. In this manner drive roller 82 may be positioned snugly underneath trees 38 held between the pairs of clamping arms in working cavity 40. Drive roller 82 is selectively rotatable by selective actuation of hydraulic motor 96 mounted in the end of the drive roller housing. When drive roller 82 has been rotated underneath working cavity 40, drive roller 82 is in opposed facing relation to upper drive roller 98 which thereby forms a drive motivator or motivating means engaging the single tree 38 or plurality of trees 38 held within working cavity 40 on all sides of the trees. In this manner, where a bundle of slender trees are held within working cavity 40, the simultaneous actuation of all of the drive rollers including drive rollers 82 and 98 and drive wheels 50 engage the bundle on opposite lateral sides and simultaneously on the upper and lower sides of the bundle so that even trees in the middle of the bundle not directly engaged by the drive rollers or drive wheels are driven in direction M for example so as to abut their ends 38a against butt plate 58. This results in the cutting of a consistent length of all of the trees to the same length by the use of chainsaw 62 when in its closed position, that is when angle α is zero. In the preferred embodiment, hydraulic motors drive the drive rollers and drive wheels, for example hydraulic motor drives 96 roller 82 when it is positioned underneath working cavity 40 by translation in direction U. Similarly, hydraulic motor 100 drives drive roller 98 and hydraulic motors 54 drive drive wheels 50. The drive wheels and drive rollers may be on hydraulic circuits as better described below wherein slippage of one particular drive roller or drive wheel is monitored by a sensor and a central processor which then ceases the drive rotation of the remaining rollers and wheels so that the drive roller or wheel which is slipping does not spin against the adjacent log or tree thereby relieving marring of the wood.

As best seen in FIG. 5, telescoping member 60 may be telescopically mounted to boom 14 by means of a tooth or serrated fitting 104 extending between the lower surface of telescoping member 60 and a corresponding upper surface within boom 14. In this embodiment, the entire telescoping member is adjusted along tooth fitting 104 and then telescoping member 60 is bolted into place so that it is rigidly then mounted to boom 14, telescoping member also supporting thereon hydraulic actuator 106 which rotates butt plate 58 about pin 108 in direction V. Hydraulic actuator 106 extends between plate 110 which is rigidly mounted to telescoping member 60, and lever arm 58a which is rigidly mounted to butt plate 58 so as to enable actuator 106 to rotate butt plate 58 about axis of rotation W in direction V. Plate 110 is rigidly mounted, for example by means of bolting, to a corresponding plate 112 rigidly mounted by means of brackets 114 to the distal end of boom 14. Thus boom 14 may be a hollow beam wherein the upper surface of the beam is cut away towards the distal end so as to provide for the mounting therein of brackets 114 and plate 112 and tooth fitting 104 so that telescoping member 60 may be mounted within the beam in a nested fit. The end of boom 14 opposite to that supporting telescoping member 60 is rigidly mounted to supporting frame 12 by means of vertical mounting plate 116 buttressed by supporting brackets 118.

As seen in FIGS. 8 and 9, coupler 18 may be used to rotate log processor 10 about axis C in direction X by the use of a pair of hydraulic motors 122 mounted within the housing of coupling 18. Hydraulic motors 122 are rigidly mounted to the upper half 18a of housing 18 so as to rotate the lower half 18b of the housing relative to the upper half 18a by the rotation of gears 122a mounted to hydraulic motors 122 rotating within ring gear 124 thereby rotating ring gear 124 and lower housing 18b to which ring gear 124 is rigidly mounted.

As noted above, trees 38 are translated longitudinally in direction M relative to processor 10 by an orchestrated interaction of hydraulic and mechanical components. In the illustrated embodiment, the mechanical components including drive wheels 50, lower drive roller 82 and upper drive roller 98 are of different diameters. For example wheels 50 may each be twenty-two inches in diameter and rollers 82 and 98 may be only six inches in diameter. The ratio between the wheel's diameters is thus approximately 4:1. The rotational speed between the wheels and rollers must be maintained to apply a constant drive speed to the trees in cavity 40 otherwise one or more wheels may be forced to slip, that is spin against the tree, or the momentum of the tree as it travels longitudinally of the processor will cause it to scrape past the slower moving wheel. Thus in the processor according to the present invention the hydraulic motor feed system driving the hydraulic motors is matched to the mechanical system to provide a level of certainty that abrasion of the trees by the wheels and rollers will not occur.

Figure 10:
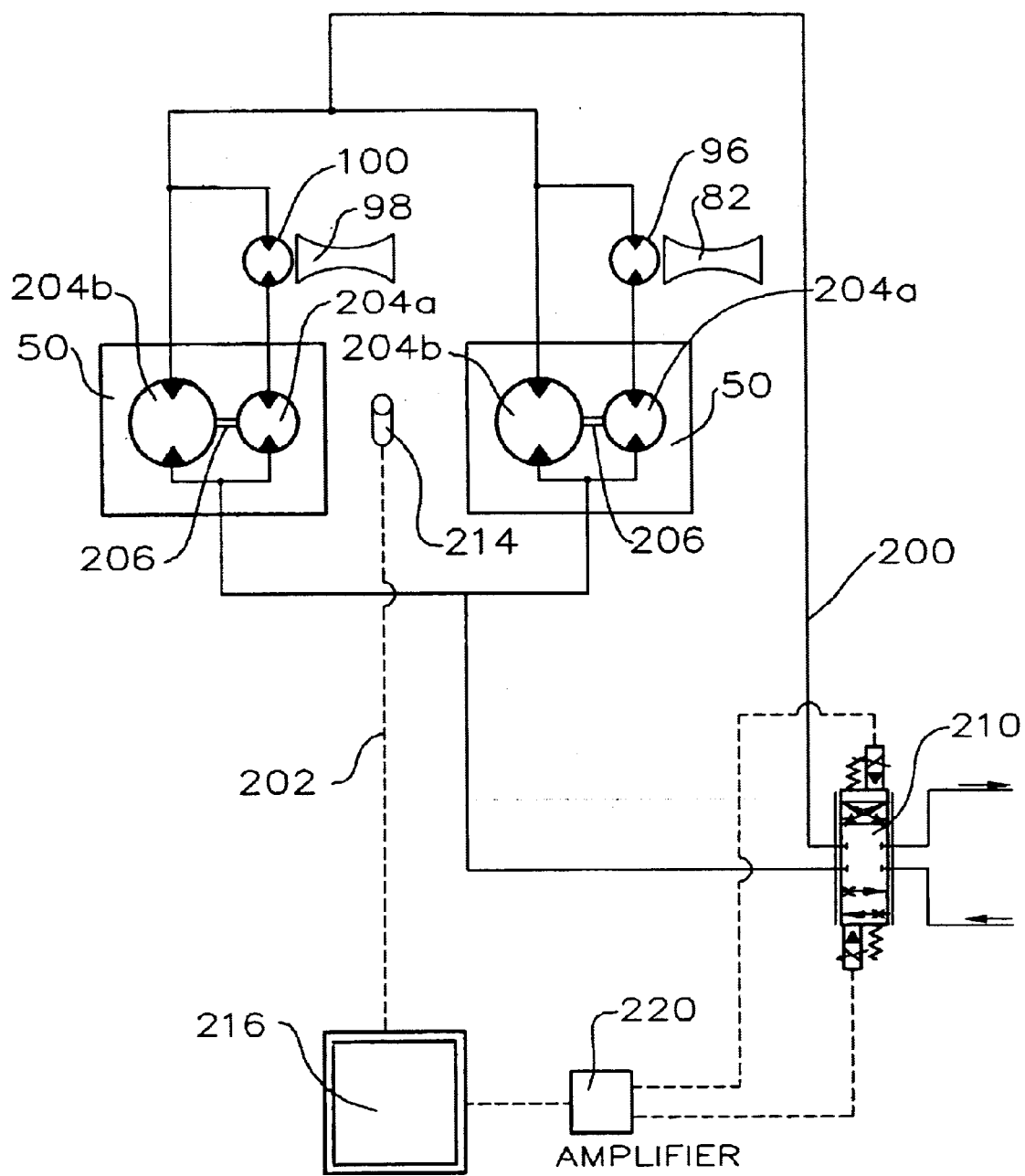
FIG. 10 is a schematic diagram of a hydraulic circuit to actuate the processor drive rollers.

Thus, in reference to FIG. 10, the hydraulic circuit 200 is illustrated in solid lines and the electrical circuit 202 is illustrated in broken lines. Each drive wheel 50 is driven by a pair of motors 204a and 204b (collectively referred to above as motors 54) within a single housing with an internal connecting shaft 206 and a common output drive shaft (not shown). Connecting shaft 206 mechanically links each motor pair together ensuring that they turn in unison. Such motors are available from Poclain Hydraulics Inc. and distributed in Canada by HyPower Systems Inc.

The smaller motor, 204a in each wheel is connected by a hydraulic circuit to either motor 100 which powers upper drive roller 98 or to motor 96 which drives lower drive roller 82. The use of twin motor drives and a series/parallel hydraulic circuit (in parallel between motors 204a and 204b, in series between motors 204a and motors 96 and 100) allows an identical ratio of the approximately 4:1 (actually 3.67:1) to be achieved between drive motors 204a and 204b. The series connection between motors 204a and either motor 100 or 96 ensures that if either motor stalls or stops both motors will stall or stop. The larger drive motor 204b in each wheel 50 is connected in parallel through hydraulic circuit 200 to motor 100 and motor 96.

Hydraulic flow through the circuit 200 is regulated by variable forward/reverse directional hydraulic valve 210 which is capable of controlling both direction and speed of flow of hydraulic fluid entering the circuit. A sensor 214 in the frame of the processor 10 alerts microprocessor 216 through electrical circuitry 202 when a tree has, for example, stopped in its travel. Microprocessor 216 then sends a corresponding signal through amplifier 220 to operate forward/reverse valve 210 to thereby regulate the flow as required to stop the drive wheels, or to forward or reverse drive them.

In interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, as will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tree processor for delimbing and cutting to a desired length of at least one workpiece simultaneously, the tree processor comprising:

an elongate rigid support member having first and second opposite ends, a coupling means mounted to an upper side of said support member for mounting of said support member to a work arm wrist coupling, selectively actuable first and second pairs of clamping arms mounted to said first and second ends of said support member, said first and second pairs of clamping arms mounted laterally across and depending downwardly from said support member and selectively actuable between open positions for entry and exit of workpieces to and from between said pairs of clamping arms, and closed positions clamped around workpieces and when in said closed positions thereby defining a workpiece processing pathway extending longitudinally under said support member and said processing pathway having lateral boundaries and a lower boundary, said pairs of clamping arms when in said closed positions cradling the at least one workpiece longitudinally under said support member, a pair of selectively actuable drive wheels mounted on selectively actuable first pivot arms pivotally mounted to said support member so as to dispose each drive wheel of said pair of drive wheels downwardly of said support member and laterally spaced apart by a selectively adjustable lateral distance apart on said lateral boundaries of said processing pathway for sandwiching between said pair of selectively actuable drive wheels the at least one workpiece when in said processing pathway, said pair of selectively actuable drive wheels for engaging and urging the at least one workpiece in substantially linear translation along said processing pathway so that the at least one workpiece in said processing pathway is delimbed by at least one of said first and second pairs of clamping arms cradling the at least one workpiece in said processing pathway, a selectively actuable upper drive means mounted to an underside of said support member so as to extend into, for urging the at least one workpiece along, said processing pathway, a selectively actuable lower drive means rotatably mounted to a lower end of a second pivot arm pivotally mounted to said support member for translation of said lower drive means between a retracted position retracted from under said processing pathway and an engaged position wherein said lower drive means extends up into, from under, said lower boundary of said processing pathway to engage and urge a lower surface of the at least one workpiece along said pathway, a selectively actuable sawing means mounted to said first end of said support member for lateral sawing in a sawing plane laterally through the at least one workpiece when in said pathway.

2. The processor of claim 1 further comprising a rigid boom extending longitudinally from and mounted to said second end of said support member, a rigid butt plate rotatably mounted to a distal end of said boom so as to be selectively pivotable into a stop position extending rigidly across said processing pathway to provide a workpiece stop at a second end of said processing pathway at a preset distance along said processing pathway.

3. The processor of claim 1 wherein said sawing means is pivotally mounted by selectively actuable pivot means to said first end of said support member for selectively pivoting said sawing means and said sawing plane about a vertical axis of rotation so that said sawing plane includes planes other than only a plane perpendicular to said longitudinally extending processing pathway.

4. The processor of claim 3 wherein said sawing plane is a vertical plane.

5. The processor of claim 4 wherein said selective pivoting of said sawing means about said vertical axis of rotation pivots said sawing plane between a non-perpendicular delimbing orientation for removing one branch of forked branches of a workpiece held in said processing pathway, and a perpendicular orientation, wherein said sawing plane is perpendicular to a longitudinal axis of said pathway, for sawing a workpiece held in said processing pathway to a length equal to a preset distance, when the workpiece is stopped against said butt plate, between said sawing means and said butt plate.

6. The processor of claim 5 wherein said sawing plane is pivotable so as to sweep out fifty-five degrees between said delimbing orientation and said perpendicular orientation.

7. The processor of claim 1 wherein said second pair of clamping arms when in said open position for accepting the at least one workpiece into said processing pathway, defines an opening between distal ends of said second pair of clamping arms which is larger than a corresponding opening between distal ends of said first pair of clamping arms when in said open position.

8. The processor of claim 7 wherein said opening of said first pair of clamping arms is twenty-two inches, and wherein said opening of said second pair of clamping arms is thirty-two inches.

9. The processor of claim 1 wherein said coupling means is mounted to said support member so that said support member balances about said coupling means with said second end of said support member inclined downwardly below said first end.

10. The processor of claim 9 wherein said second end is inclined downwardly by generally fifteen degrees from said first end.

11. The processor of claim 2 wherein said butt plate is mounted to said boom by a selectively telescoping boom extension for adjusting said preset distance between said butt plate and said sawing means.

12. The processor of claim 2 wherein said butt plate is selectively pivotable by a butt plate pivot means between an elevated position so as to be removed from stopping the at least one workpiece translating from said second end of said support member along said processing pathway, and said stop position across said processing pathway.

13. The processor of claim 1 wherein each of said drive wheels of said pair of drive wheels and said upper and lower drive means have corresponding independently actuable motors each providing an independent actuating force.

14. The processor of claim 13 wherein said upper and lower drive means are rollers.

15. The processor of claim 13 further comprising sensor means to detect slipping rotation of any of said drive means slipping in their engagement with the at least one workpieces and to communicate with said processor, causing said processor to communicate with said drive means to reduce or reverse said actuating force.

* * * * *